United States Patent
Ferreira et al.

(10) Patent No.: US 7,712,029 B2
(45) Date of Patent: May 4, 2010

(54) REMOVING PERSONAL INFORMATION WHEN A SAVE OPTION IS AND IS NOT AVAILABLE

(75) Inventors: Jorge M. Ferreira, Redmond, WA (US); Mandira Virmani, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 815 days.

(21) Appl. No.: 09/755,418

(22) Filed: Jan. 5, 2001

(65) Prior Publication Data

US 2002/0091741 A1    Jul. 11, 2002

(51) Int. Cl.
  *G06F 17/24* (2006.01)
(52) U.S. Cl. ............... 715/256; 715/741; 715/743; 713/165
(58) Field of Classification Search ......... 715/530–531, 715/500, 200, 273, 203, 255–256, 741–743; 709/203; 713/182, 193, 164–167
See application file for complete search history.

(56) References Cited

U.S. PATENT DOCUMENTS

| | | | |
|---|---|---|---|
| 5,991,878 A * | 11/1999 | McDonough et al. | 713/200 |
| 6,275,824 B1 * | 8/2001 | O'Flaherty et al. | 707/9 |
| 6,457,002 B1 * | 9/2002 | Beattie et al. | 707/3 |
| 6,490,601 B1 * | 12/2002 | Markus et al. | 715/507 |
| 6,629,843 B1 * | 10/2003 | Bunting et al. | 434/118 |
| 6,970,836 B1 | 11/2005 | Paltenghe et al. | 705/18 |
| 7,069,427 B2 | 6/2006 | Adler et al. | 726/6 |
| 7,181,017 B1 | 2/2007 | Nagel et al. | 380/282 |
| 7,289,971 B1 | 10/2007 | O'Neil et al. | 705/44 |
| 7,386,550 B2 | 6/2008 | Brun | 707/9 |
| 7,424,543 B2 * | 9/2008 | Rice, III | 709/229 |
| 2001/0056463 A1 * | 12/2001 | Grady et al. | 709/203 |
| 2002/0112167 A1 | 8/2002 | Boneh et al. | 713/182 |
| 2003/0004734 A1 | 1/2003 | Adler et al. | 705/1 |
| 2003/0014418 A1 | 1/2003 | Adler et al. | 707/100 |
| 2003/0014654 A1 | 1/2003 | Adler et al. | 726/6 |
| 2003/0051054 A1 * | 3/2003 | Redlich et al. | 709/246 |
| 2003/0097594 A1 | 5/2003 | Penders | 726/15 |
| 2003/0130893 A1 | 7/2003 | Farmer | 705/14 |
| 2004/0049294 A1 * | 3/2004 | Keene et al. | 700/5 |
| 2004/0078596 A1 | 4/2004 | Kent et al. | 713/201 |
| 2004/0199782 A1 | 10/2004 | Arnold | 726/27 |

(Continued)

OTHER PUBLICATIONS

Habraken, J., StarOffice 5.2 Calc Handbook., Prentice Hall , Dec. 2000, Chapter 2.*

(Continued)

*Primary Examiner*—Cesar B Paula
(74) *Attorney, Agent, or Firm*—Merchant & Gould

(57) ABSTRACT

The present invention is directed to a method of removing a user's personal information from a document via activation of a "privacy option." The privacy option, when activated, removes personal information from a document and, in some case, replaces the user information with generic information. The present invention is also directed to a computing system with an application module, which contains a privacy option for removing one or more pieces of personal information from a document created by a software application usable on the computing system. The present invention is further directed to a computer readable medium having stored thereon computer-executable instructions for performing the steps of modifying one or more pieces of personal information associated with a document via a privacy option.

17 Claims, 7 Drawing Sheets

U.S. PATENT DOCUMENTS

| | | | |
|---|---|---|---|
| 2004/0205567 A1 | 10/2004 | Nielsen | 715/234 |
| 2005/0027618 A1* | 2/2005 | Zucker et al. | 705/26 |
| 2005/0050028 A1 | 3/2005 | Rose et al. | 707/3 |
| 2005/0097455 A1 | 5/2005 | Zhou et al. | 715/234 |
| 2005/0138110 A1* | 6/2005 | Redlich et al. | 709/201 |
| 2006/0019634 A1 | 1/2006 | Hawkes | 455/411 |
| 2006/0095956 A1 | 5/2006 | Ashley et al. | 726/4 |
| 2006/0136985 A1 | 6/2006 | Ashley et al. | 726/1 |
| 2006/0143459 A1 | 6/2006 | Villaron et al. | 713/176 |
| 2006/0212713 A1 | 9/2006 | Hatakeda | 713/182 |
| 2007/0038437 A1 | 2/2007 | Brun | 704/9 |
| 2007/0271463 A1* | 11/2007 | Ginter et al. | 713/176 |
| 2008/0086523 A1 | 4/2008 | Afergan et al. | 709/202 |
| 2008/0092058 A1 | 4/2008 | Afergan et al. | 715/745 |
| 2008/0147554 A1 | 6/2008 | Stevens et al. | 705/51 |

OTHER PUBLICATIONS

Memorandum and four figures regarding StarOffice 5.1; date is unknown, but believed to be earlier than Jan. 5, 2001.

U.S. Appl. No. 11/021,725, filed Dec. 23, 2004 entitled "Method and System for Managing Personally Identifiable Information and Sensitive Information in an Application-Independent Manner".

U.S. Appl. No. 11/083,526, filed Mar. 18, 2005 entitled "Management and Security of Personal Information".

Plaxo Products, Sep. 17, 2004, http://web.archive.org/web/20040917032222/plaxo.com/products.

Plaxo Your Privacy Choices, Sep. 23, 2004, http://web.archive.org/web/20040923061703/plaxo.com/privacy/q_and_a.

Plaxo Your Privacy Choices, Sep. 29, 2004, http://web.archive.org/web/20040929130829/plaxo.com/privacy/privacy_choices.

Plaxo's Personal Card: Revised Plaxo Privacy Policy—2.0, Oct. 9, 2004, http://web.archive.org/web/20041009201934/blog.plaxo.com/archives/000022.html.

U.S. Office Action dated Jul. 14, 2009 cited in U.S. Appl. No. 11/021,725.

U.S. Final Office Action dated Jan. 13, 2009 cited in U.S. Appl. No. 11/021,725.

U.S. Office Action dated Apr. 1, 2009 cited in U.S. Appl. No. 11/083,526.

U.S. Final Office Action dated Oct. 27, 2009 cited in U.S. Appl. No. 11/083,526.

U.S. Office Action dated Jun. 13, 2008 cited in U.S. Appl. No. 11/021,725.

* cited by examiner

REMOVING PERSONAL INFORMATION WHEN A SAVE OPTION IS AND IS NOT AVAILABLE

FIELD OF THE INVENTION

The present invention is directed to methods of removing a user's personal information from an electronic document.

BACKGROUND OF THE INVENTION

The privacy and/or security of a user of an electronic document has become an important issue during the information age. The creation and manipulation of a single document for business or personal use gives rise to concern about the accessibility of personal information about a user associated with the document. In today's business world, a single document may be intentionally or unintentionally accessible to numerous persons including fellow co-workers, competitors, and computer hackers. Consequently, users of a document have become very concerned about protecting their personal information associated with a document.

Many computer software applications require personal information from a user to install and/or run the application. For example, when a user installs an application on a computer, the application may ask the user to provide a user name or some other piece of personal information such as a company name or project name for installation purposes. In addition, the user may input other pieces of personal information into data fields of a document without prompting from the application. The user's name, or other piece of personal information, may be stored and later used by one or more operating features within the given application. Further, the user name or other piece of personal information may be automatically added to a document, created by the given application when one or more operating features within the given application are used.

One example of the use of personal information in a software application may be found in Microsoft Corporation's OFFICE 2000 application. In a document created by the OFFICE 2000 application, there are many places where personal information, such as the document author's name, is stored. The number of times and the places in which the author's name shows up in a document depends on the features used. For instance, in the Microsoft Corporation's WORD application, when you add a comment to a document, by default, an OFFICE 2000 application adds the name of the document author in the comment. Once the document has been saved with the comment, there is currently no way to remove the author's name from the comment other than by deleting the comment. Similarly, when you save the document, the WORD application automatically adds the name of the document author to the properties of the file. In order to remove the author's name, a user has to remember to go to the File Properties dialog, delete the author name from the File Properties dialog, and then resave the document.

What is needed in the art is a method of easily removing an author's or user's personal information associated with a document created by a software application.

SUMMARY OF THE INVENTION

The present invention addresses some of the difficulties and problems discussed above by the discovery of a method of removing a user's personal information from a document via activation of a "privacy option." The privacy option, when activated, removes personal information from a document and, in some case, replaces the user information with generic information. The privacy option may be used to remove personal information from a document once the document is saved by the application. Alternatively, if an application does not support a "save" function for a particular document type, personal information may be removed once the privacy option is activated for a given document. The privacy option may be used to make inaccessible any personal information associated with a document.

Accordingly, the present invention is directed to a method for removing personal information from a document, which has been produced by a given application, wherein the method comprises the step of selecting a privacy option provided by the application, wherein the privacy option removes one or more pieces of personal information from the document or replaces one or more pieces of personal information within the document with generic information.

The present invention is also directed to a computing system containing one or more application modules, wherein at least one application module contains a document-generating application and a privacy option for removing one or more pieces of personal information from a document created by the application.

The present invention is further directed to a computer readable medium having stored thereon computer-executable instructions for performing the steps of removing or replacing one or more pieces of personal information associated with a document via a privacy option.

These and other features and advantages of the present invention will become apparent after a review of the following detailed description of the disclosed embodiments and the appended claims.

BRIEF DESCRIPTION OF THE FIGURES

FIG. 2b is a continuation of the flow diagram depicted in FIG. 2a.

DETAILED DESCRIPTION OF THE INVENTION

The present invention is directed to a method of removing personal information from an electronic document, which has been created by a given application. The present invention allows a user to install a given application, create a document within the application, and then remove any personal information associated with the document prior to exposure of the document to parties other than the user.

In many applications used to create an electronic document, one or more pieces of personal information (i.e., information about the author of the document, the user of the document, and/or information about the document itself) are requested by the application and/or entered by the user into one or more data storage files of the application, and used by the application for various purposes. For example, during installation of an application, a user's name or some other piece of information may be requested by the application. Further, a user may desire to identify a new document by entering information about the document, such as the user's name or the user's manager's name, in a file properties file associated with the document. In addition, the application may automatically display one or more pieces of personal information added by the user when a particular feature of the application is used, such as a comments feature. In the present invention, a single privacy option may be used to remove personal information from a document, providing privacy to the user even when the document becomes accessible to third parties (i.e., parties other than the user) via a personal computer, a computer system network, or the Internet.

Exemplary Operating Environment

Figure 1:
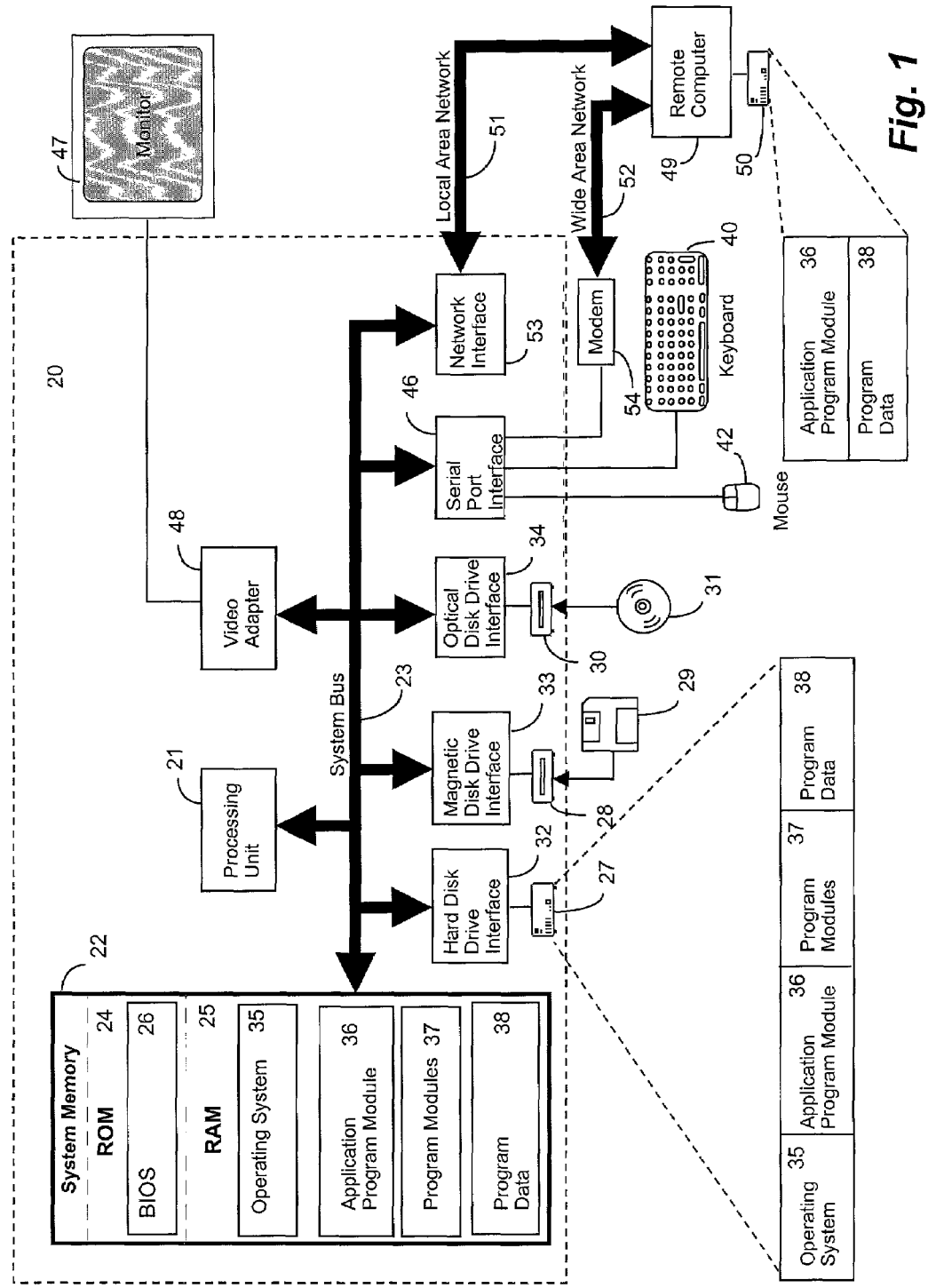
FIG. 1 is a flow diagram of some of the primary components of an exemplary operating environment for implementation of the present invention.

Exemplary embodiments of the present invention will hereinafter be described with reference to the drawings, in which like numerals represent like elements throughout the several figures. FIG. 1 illustrates an exemplary operating environment for implementation of the present invention. The exemplary operating environment includes a general-purpose computing device in the form of a conventional personal computer 20. Generally, a personal computer 20 includes a processing unit 21, a system memory 22, and a system bus 23 that couples various system components including the system memory 22 to processing unit 21. System bus 23 may be any of several types of bus structures including a memory bus or memory controller, a peripheral bus, and a local bus using any of a variety of bus architectures. The system memory includes a read only memory (ROM) 24 and random access memory (RAM) 25. A basic input/output system (BIOS) 26, containing the basic routines that help to transfer information between elements within personal computer 20, such as during start-up, is stored in ROM 24.

Personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. Hard disk drive 27, magnetic disk drive 28, and optical disk drive 30 are connected to system bus 23 by a hard disk drive interface 32, a magnetic disk drive interface 33, and an optical disk drive interface 34, respectively. Although the exemplary environment described herein employs hard disk 27, removable magnetic disk 29, and removable optical disk 31, it should be appreciated by those skilled in the art that other types of computer readable media, which can store data that is accessible by a computer, such as magnetic cassettes, flash memory cards, digital video disks, Bernoulli cartridges, RAMs, ROMs, and the like, may also be used in the exemplary operating environment. The drives and their associated computer readable media provide nonvolatile storage of computer-executable instructions, data structures, program modules, and other data for personal computer 20. For example, one or more data files 60 (not shown) may be stored in the RAM 25 and/or hard drive 27 of the personal computer 20.

A number of program modules may be stored on hard disk 27, magnetic disk 29, optical disk 31, ROM 24, or RAM 25, including an operating system 35, an application program module 36, other program modules 37, and program data 38. Program modules include, but are not limited to, routines, sub-routines, programs, objects, components, data structures, etc., which perform particular tasks or implement particular abstract data types. Aspects of the present invention may be implemented as an integral part of an application program module 36 or as a part of another program module 37.

A user may enter commands and information into personal computer 20 through input devices, such as a keyboard 40 and a pointing device 42. Other input devices (not shown) may include a microphone, joystick, game pad, satellite dish, scanner, or the like. These and other input devices are often connected to processing unit 22 through a serial port interface 46 that is coupled to the system bus 23, but may be connected by other interfaces, such as a parallel port, game port, a universal serial bus (USB), or the like. A monitor 47 or other type of display device may also be connected to system bus 23 via an interface, such as a video adapter 48. In addition to the monitor, personal computers typically include other peripheral output devices (not shown), such as speakers and printers.

Personal computer 20 may operate in a networked environment using logical connections to one or more remote computers 49. Remote computer 49 may be another personal computer, a server, a client, a router, a network PC, a peer device, or other common network node. While a remote computer 49 typically includes many or all of the elements described above relative to personal computer 20, only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, personal computer 20 is connected to local area network 51 through a network interface or adapter 53. When used in a WAN networking environment, personal computer 20 typically includes a modem 54 or other means for establishing communications over WAN 52, such as the Internet. Modem 54, which may be internal or external, is connected to system bus 23 via serial port interface 46. In a networked environment, program modules depicted relative to personal computer 20, or portions thereof, may be stored in the remote memory storage device 50. It will be appreciated that the network connections shown are exemplary and other means of establishing a communications link between the computers may be used.

Moreover, those skilled in the art will appreciate that the present invention may be implemented in other computer system configurations, including hand-held devices, multi-processor systems, microprocessor based or programmable consumer electronics, network person computers, minicomputers, mainframe computers, and the like. The present invention may also be practiced in distributed computing environments, where tasks are performed by remote processing devices that are linked through a communications network. In a distributed computing environment, program modules may be located in both local and remote memory storage devices.

Implementation of Exemplary Embodiments of the Present Invention

One embodiment of the present invention is directed to a method of removing one or more pieces of personal information from an electronic document, which is produced from a document-generating application. The method comprises activating a privacy option for the document. As used herein, the term "privacy option" describes an optional command, activatable by a user, which enables the process of removing one or more pieces of personal information from a document. The privacy option is a feature of a given application, which usually remains "off" for a given document until activated by a user. Once activated or turned "on," the privacy option puts into motion the process of removing personal information from a document or replacing personal information within a document with generic information.

The privacy option is specific to a given electronic document created by an application. In other words, activation of the privacy option in Document 1 does not effect the privacy option of an unrelated, newly created Document 2, which is subsequently opened after the activation of the privacy option in Document 1. In order to remove personal information from newly created Document 2, the privacy option for Document 2 must be activated. It should be noted that in some applications, if Document 1 is used as a template to create a new Document 2 and the privacy option is activated in Document 1, the privacy option for Document 2 may be automatically activated upon creation of Document 2.

The privacy option feature of a given application may be located anywhere within the application as long as the privacy option is readily available to a user. In applications with a Tools Options dialog, such as Microsoft Corporation's WORD application, EXCEL application, POWERPOINT® application, and ACCESS application, the privacy option may be a feature within the Tools Options dialog. The privacy option may be as simple as a checkbox, which is activated when checked, and not activated when not checked. In other applications, the privacy option may appear as a prompt prior to closing a document. In this embodiment, a user has the option to activate the privacy option prior to closing the document if the privacy option has not been activated. In other applications, the privacy option may be present from a separate, user interface (i.e., other than in a dialog).

Examples of suitable privacy options and their possible description and location within a given application are given below. Suitable privacy options include, but are not limited to, a checkbox entitled "Remove personal information from this file on save" for Microsoft Corporation's WORD application, EXCEL application, and POWERPOINT® application; and a checkbox entitled "Remove personal information from this file" for Microsoft Corporation's ACCESS application. Suitable locations for the privacy options within the above Microsoft Corporation applications include, but are not limited to, the "Tools Options Security" location in Microsoft Corporation's WORD application, EXCEL application, and POWERPOINT® application; and the "Tools Options General (database)" location or the "Property Browser (datapage)" location in Microsoft Corporation's ACCESS application. It should be noted that the above privacy option descriptions and locations within the given applications are only examples of suitable descriptions and locations, and are not meant to limit the privacy option in any particular way.

The privacy option may initiate the removal or replacement of one or more pieces of personal information from an electronic document by filtering through the document, identifying personal information, and removing or replacing one or more pieces of personal information from the document. One or more events may take place while a document is open to trigger the removal of personal information from the document. Examples of such events include, but are not limited to, (1) activation of the privacy option; (2) entry of new personal data into a document after activation of the privacy option; and (3) saving the document after activation of the privacy option. Desirably, in applications that support a save function, personal information is removed from the document at the time the document is saved, after activation of the privacy option. Desirably, in applications that do not support the save function, personal information is removed from the document at the following times: (a) when the privacy option is turned on, and (b) when new personal data is entered into the document after activation of the privacy option.

In one embodiment of the present invention, the method of removing personal information from an electronic document comprises activating a privacy option, wherein activation of the privacy option results in the removal of one or more pieces of personal information from the document or the replacement of one or more pieces of personal information within the document with generic information. In this embodiment, as soon as the privacy option is turned "on" one or more pieces of personal information are removed (or replaced) from the memory representation of the document, as well as, the file representation of the document. As used herein, the "memory representation" of the document refers to the document component, which is visible to the user when the document is being viewed from the application, and is present in the memory of the computing system. As used herein, the "file representation" of the document refers to the document component, which is saved to the disk of the computing system. Further changes to the document by a user will continue to be subjected to the privacy option until the privacy option is deactivated or turned "off."

In a further embodiment of the present invention, personal information may be removed from a document once the privacy option is turned on, even when a feature, which adds additional personal information to the document, is subsequently used within the document. For example, in the application ACCESS, which does not contain a save function, a user can turn on the privacy option for a document, which removes any personal information from the document at that time. If the user subsequently edits the File Properties of the document, such as by adding an author name or a company name, these pieces of personal information may be removed from the document at either of the following times: (1) as soon as the user adds the information to the File Properties of the document, or (2) as soon as the user chooses "OK" from the File Properties dialog box. Alternatively, activation of the privacy option in the application, such as ACCESS, prevents the addition of any personal information into a given dialog box.

In yet a further embodiment of the present invention, the method of removing personal information from an electronic document comprises the steps of activating a privacy option, and saving the document. In this embodiment, activation of the privacy option enables the removal (or replacement) of one or more pieces of personal information from the document, while the step of saving the document results in the removal (or replacement) of the one or more pieces of personal information from the document. When the privacy option is turned "on," personal information remains in both the memory representation of the document, as well as, the file representation of the document. However, once the document is saved with the privacy option activated, one or more pieces of personal information are removed from the memory representation of the document, as well as, the file representation of the document. It should be noted that in this embodiment, further changes to the document will not be affected by the privacy option unless the document is saved following changes to the document.

In the embodiments above, when the privacy option is activated or the electronic document is saved, the application code scans the document for any feature, which uses personal information such as an author's name. The application code may remove the personal information completely from a text box, leaving a blank in the text box. Alternatively, the application code may replace the personal information with generic information. For example, the application code may be programmed to replace an author's name, such as Mary Smith, with the generic word "Author." Any string of generic information may be used by the application code. Suitable examples of generic strings include, but are not limited to, a string of letters, numbers, symbols, spaces, or a combination thereof.

Examples of personal information, which may be removed using the method of the present invention, include, but are not limited to, an author's name, a user's name, a company name, a manager's name, the name of the user who last saved the electronic document, and an e-mail address. The personal information may be removed from any part of the document, which is accessible to third parties. Suitable parts of a document include, but not limited to, the file properties of the document, a comment box of a document, and an e-mail header. It should be noted that the privacy option of the present invention, when activated, does not remove personal information that is part of the text of a document. For example, activation of the privacy option does not remove the document author's name, which is typed in the document as text.

Further, it should be noted that the privacy option of the present invention may be used to selectively remove and/or replace one or more pieces of personal information from a document. As discussed above, one or more pieces of personal information within a document, which is viewable or accessible to third parties, may be removed from the document or replaced with a generic string of information. Other pieces of personal information intentionally inputted into the document, such as digital signatures, may remain in the document even when the privacy option is activated.

The privacy option of the present invention may be used on any application that stores, saves, and/or uses one or more pieces of personal information as described above. Suitable applications, which may contain the privacy option of the present invention, include, but are not limited to, the following Microsoft Corporation applications: the OFFICE application, the WORD application, the EXCEL application, the POWERPOINT® application, and the ACCESS application.

Figure 2A:
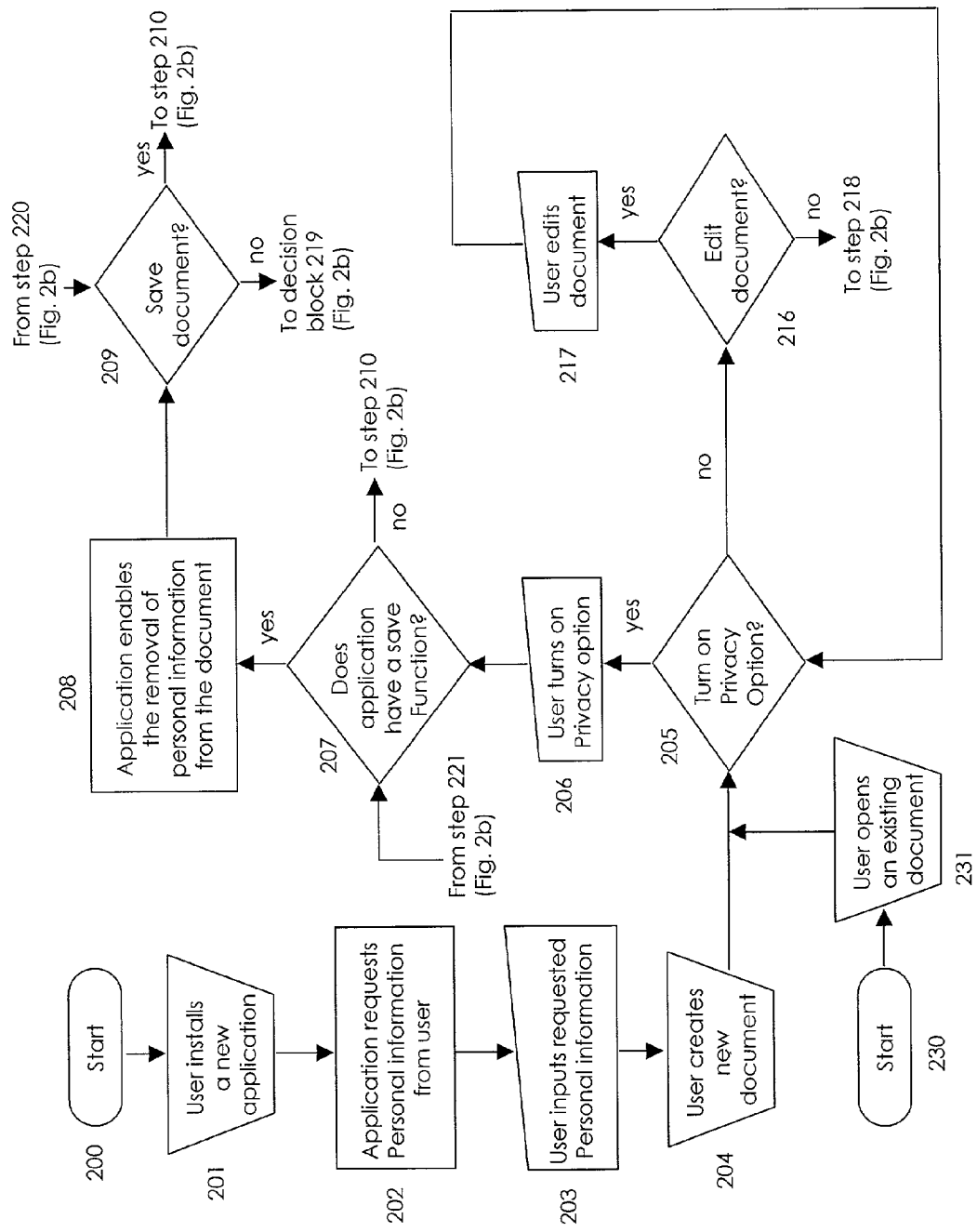
FIG. 2a is a diagram illustrating an exemplary method for removing or replacing one or more pieces of personal information from an electronic document.
Figure 2B:
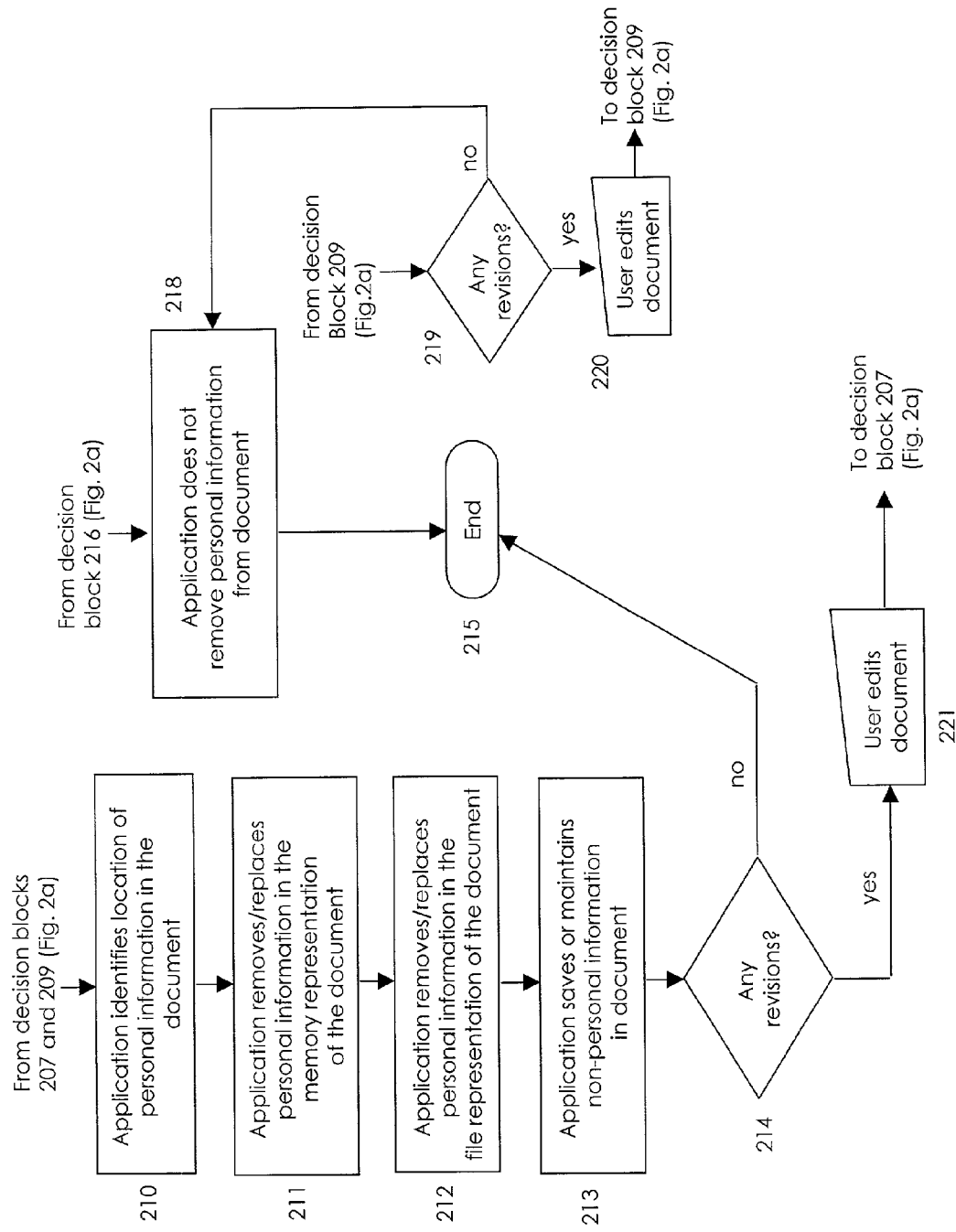

An example of possible steps in the method of removing personal information from an electronic document as embodied by the present invention is described in the flow charts of FIGS. 2a and 2b. The flow charts of FIGS. 2a and 2b describe one or more possible steps in the method of removing personal information from a document. In a first method, the method starts at step 200 and proceeds to step 201. At step 201, the user installs a new application, such as application module 36, onto a computing system (not shown), similar to the computing system of FIG. 1. The method proceeds to step 202, where the application requests one or more pieces of personal information from the user. At the next step 203, the user inputs the requested personal information. The application saves the personal information received from the user in a registry. As used herein, the term "registry" refers to a central hierarchial database in an application, such as Microsoft Corporation's WINDOWS NT, which stores information necessary to configure the operating system for one or more users, applications, and hardware devices. The method then proceeds to step 204. At step 204, the user creates a new document using the application.

The method proceeds to decision block 205. At decision block 205, the user decides whether or not to turn on the privacy option at this time. If the user decides not to turn on or activate the privacy option, the method proceeds to step 215 (described below). If the user decides to turn on or activate the privacy option, the method proceeds to step 206. At step 206, the user activates the privacy option. The method then proceeds to decision block 207. At decision block 207, it is determined whether or not the application has a save function. If the application does not have a save function, the method proceeds to step 210 (described below). If the application has a save function, the method proceeds to step 208. At step 208, the application enables the removal of personal information from the document, but does not actually remove personal information from the document until the save function is executed. The method then proceeds to decision block 209. At decision block 209, the user decides whether or not to save the document at this time.

If, at decision block 209, the save function is initiated, the method proceeds to steps 210 to 213, as shown in FIG. 2b. If the save function is not initiated, the method proceeds to decision block 219 (described below). At step 210, the application identifies the location of one or more pieces of personal information in the document. At step 211, the application removes and/or replaces one or more pieces of personal information in the memory representation of the document. The method then proceeds to step 212. At step 212, the application removes and/or replaces one or more pieces of personal information in the file representation of the document. The method then proceeds to step 213. At step 213, the application saves the non-personal information in the document. The method proceeds to decision block 214. At decision block 214, the user decides whether or not to edit the document at this time. If no revisions are made, the method ends at step 215.

At decision block 207, if the application does not have a save function, the method proceeds directly to step 210 and proceeds from step 210 as described above. In this embodiment, activation of the privacy option results in the immediate removal and/or replacement of personal information within the document. In other words, a save function is not necessary to remove and/or replace personal information within the document.

Referring once again to decision block 205, if the user does not activate the privacy option, the method of the third pathway proceeds to decision block 216. At decision block 216, the user decides whether or not to edit the document at this time. If the user decides to edit the document, the method proceeds to step 217. At step 217, the user edits the document. In this step, the user may utilize a feature of the application, such as a comment feature, which results in the utilization and display of one or more pieces of stored personal information inputted by the user at step 203. The method then returns back to decision block 205.

Referring again to decision block 216, if the user decides not to edit the document at this time, the method proceeds to step 218. At step 218, the application does not remove any personal information from the document because the privacy option has not been activated. The method ends at step 215.

Referring now to decision block 209, if the user decides not to save the document at this time, the method then proceeds to decision block 219. At decision block 219, if the user decides not to edit the document, the method proceeds to step 218. At this step, the application does not remove any personal information from the document because the save function has not been used. The privacy option has been turned "on," but the document has not been saved to activate the removal process. At decision block 219, if the user decides to edit the document, the method proceeds to step 220. At step 220, the user edits the document. The method then returns to decision block 209 and proceeds as described above.

Referring now to decision block 214, if the user decides to edit the document at this time, the method then proceeds to step 221. At step 221, the user edits the document. The method then returns to decision block 207 and proceeds as described above.

FIGS. 2a and 2b also display a method wherein a user opens an existing document, and then decides whether or not to activate a privacy option for the document. This method begins at step 230. The method proceeds to step 231, where the user opens an existing document. From step 231, the method proceeds to decision block 205 and continues along one of the pathways described above.

Figure 3:
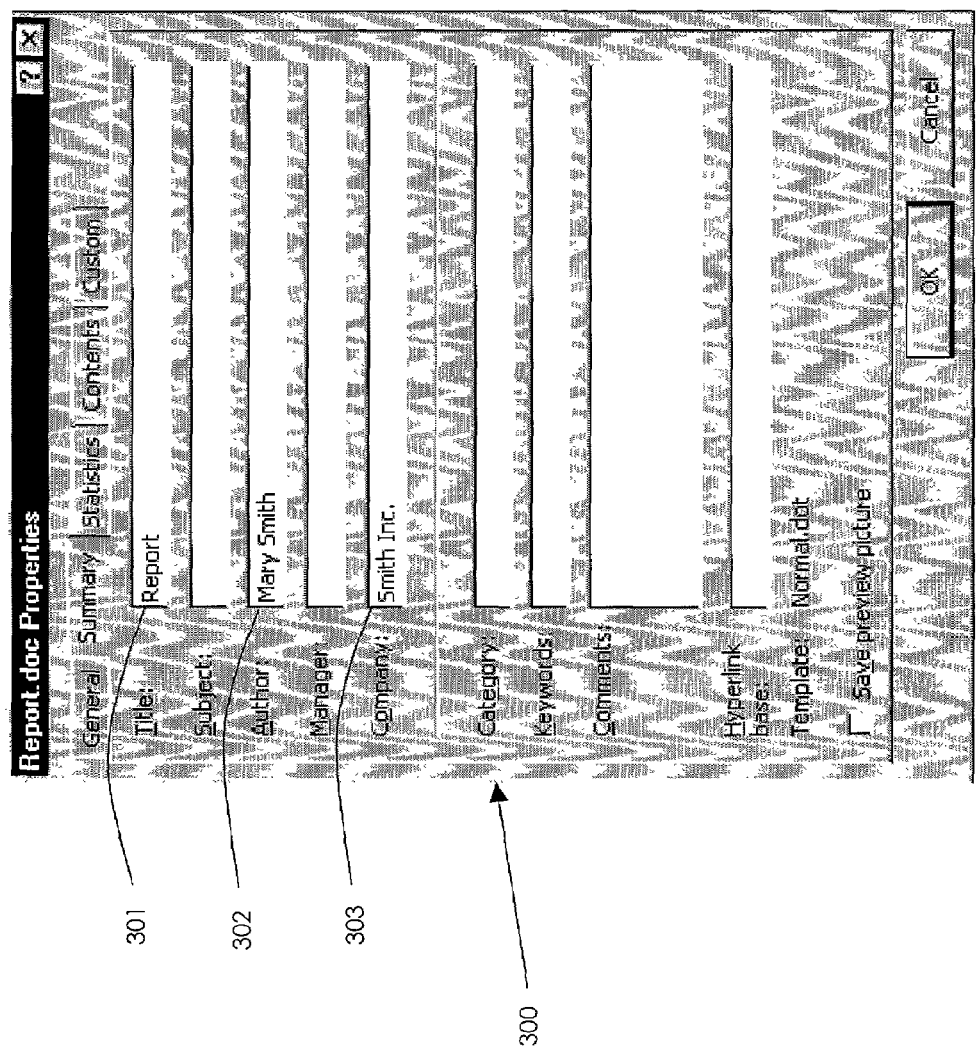
FIG. 3 illustrates an example of personal information in a file properties dialog of an OFFICE 2000 document.

In one exemplary embodiment of the present invention, a privacy option feature may be added to Microsoft Corporation's WORD application to function as shown in FIGS. 3-6. A document created by Microsoft Corporation's WORD application may have some file properties associated with the document, which contains one or more pieces of personal information including, but not limited to, the document title, the subject matter of the document, the author of the document, the author's manager, and a company name. One or more pieces of personal information in the File Properties may have been (1) requested from the user upon installation of Microsoft Corporation's WORD application and/or (2) inputted by the user upon opening or creating the document. As shown in FIG. 3, the File Properties 300 contains the word "Report" in title box 301, the author's name "Mary Smith" in author box 302, and the company name "Smith Inc." in company box 303 prior to activation of a privacy option and saving of the document.

Figure 4:
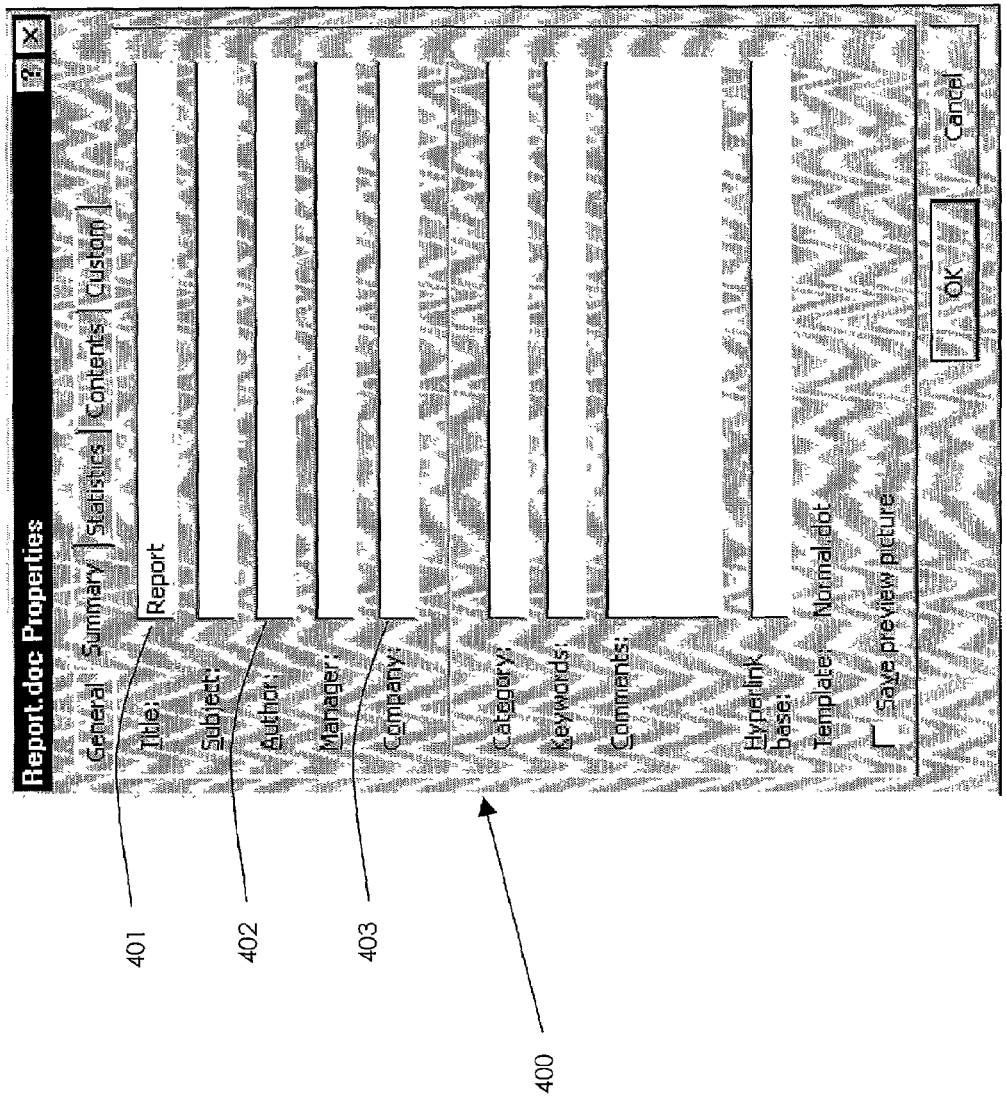
FIG. 4 illustrates the file property dialog of FIG. 3 following removal of the personal information once stored in the file.

FIG. 4 depicts the File Properties of FIG. 3 following removal of personal information from a document via activation of a privacy option and saving the document. As shown in FIG. 4, activation of the privacy and save options results in the following changes to File Properties 400: removal of the author's name "Mary Smith" from author box 402, and removal of company name "Smith Inc." from the company box 403. In this example, activation of the privacy option did not effect a change in the title box 401; however, it should be noted that activation of a privacy option may be programmed through code to effect changes in one or more data boxes within the File Properties of a document.

Figure 5:
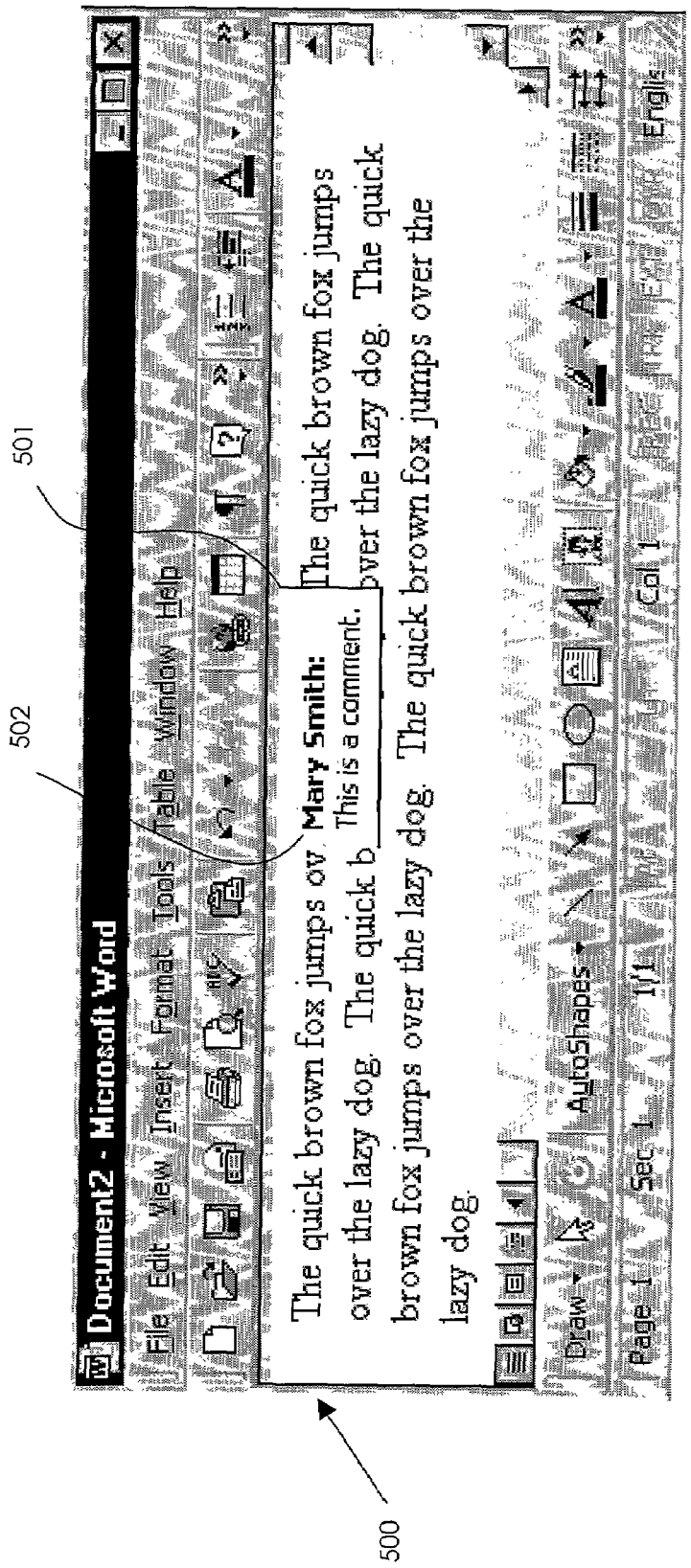
FIG. 5 illustrates an example of personal information in a comment block of a document created by Microsoft Corporation's WORD application.
Figure 6:
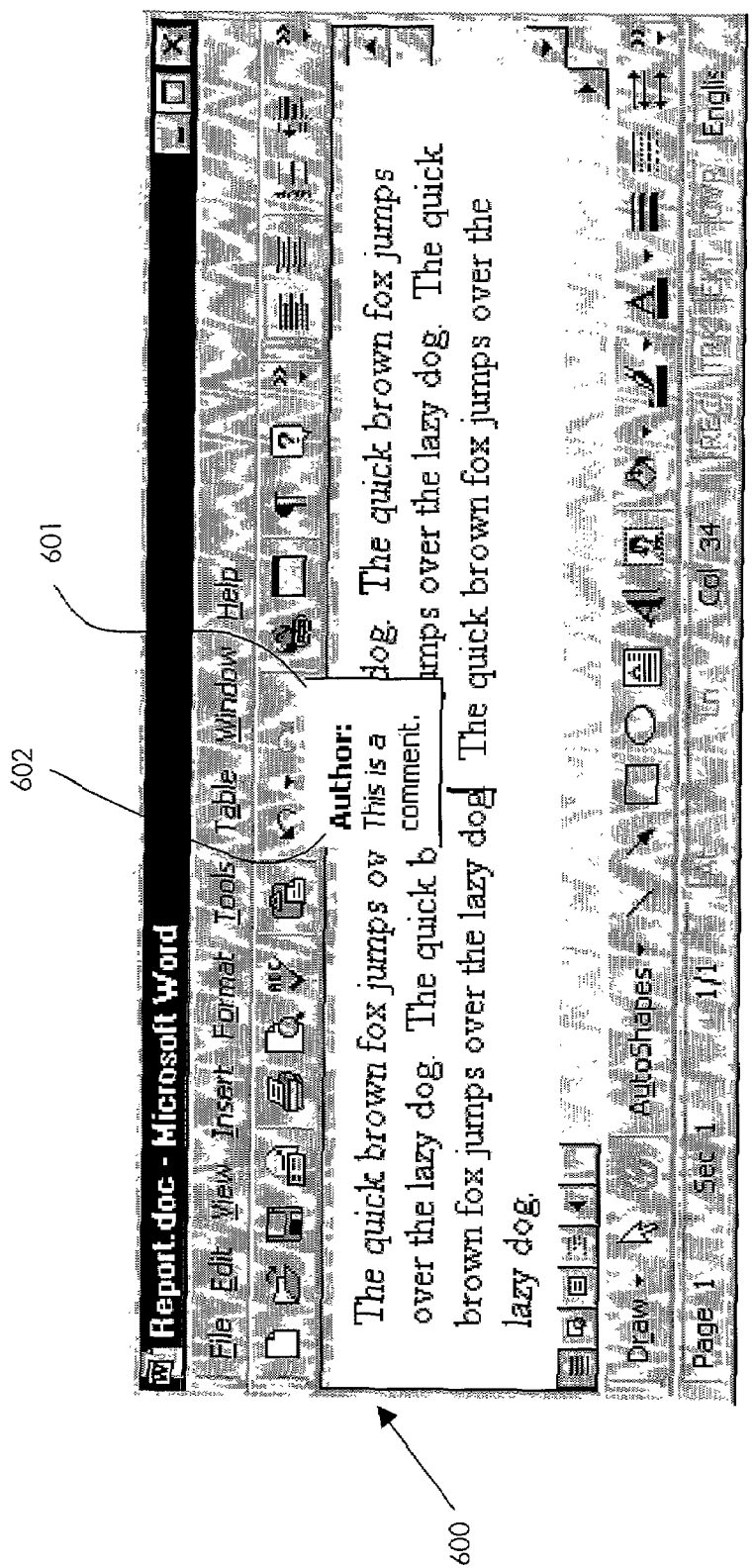
FIG. 6 illustrates the comment block of FIG. 5 following removal of the personal information once stored in the comment block.

Activation of the privacy option in a document created by Microsoft Corporation's WORD application may also produce the following changes as shown in FIGS. 5-6. In Microsoft Corporation's WORD application, if a user adds a comment to the document, the document user's name is added as part of the comment. In a WORD document 500 shown in FIG. 5, a user adds a comment relating to the word "dog" in line 3 of the document. The WORD application automatically adds to comment box 501 the name of the user, "Mary Smith," 502 to the comment.

FIG. 6 depicts the comment box of the document following removal of personal information from a document via activation of the privacy option in Microsoft Corporation's WORD application. As shown in FIG. 6, activation of the privacy option results in the following changes to comment box 600: removal of the author's name "Mary Smith" from comment box 601, and replacement of the author's name with a generic string of information, in this case, the word "Author" 602. It should be noted that activation of the privacy option did not affect the text within the comment section (i.e., "This is a comment.") of the comment box.

The present invention is also directed to a computing system containing one or more application modules, wherein at least one application module contains a document-generating application and a privacy option for removing one or more pieces of personal information from an electronic document created by the document-generating application usable on the computing system.

The present invention is further directed to a computer readable medium having stored thereon computer-executable instructions for performing the steps of modifying one or more pieces of personal information associated with an electronic document via a privacy option.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method for removing personal information from a first document created by a document-generating application that stores the personal information and makes the personal information visible at a comment block of the document, the method comprising:

activating a privacy option comprising computer-implemented instructions provided by the document-generating application;

removing from all portions of the first document except for a body of the first document at least one piece of the personal information without deleting the first document, the at least one piece of the personal information being requested by the document-generating application during installation of the document-generating application;

replacing the at least one piece of personal information created by the document-generating application with generic information visible at each comment block of the first document, wherein the generic information was not previously visible at each comment block of the first document;

receiving at least one additional piece of personal information into the first document after activation of the privacy option of the first document, wherein the at least one additional piece of personal information entered into the first document is one of the following:

when a save option is not available for the first document, removed from the first document as soon as the at least one additional piece of personal information is added to the first document, and when the save option is available for the first document, removed from the document as soon as the first document is saved; and saving the first document, when the save option is available for the first document, with the generic information replacing the at least one piece of removed personal information and the at least one additional piece of personal information, wherein saving the first document comprises, in response to activating the privacy option, replacing the at least one piece of removed personal information and the at least one additional piece of personal information with the generic information in both a memory representation of the first document and a file representation of the first document.

2. The method of claim 1, wherein removing from all portions of the first document except for the body of the first document the at least one piece of the personal information without deleting the first document comprises removing the at least one piece of personal information comprising at least one of the following: an author's name, a user's name, a company name, a manager's name, a last saved by name, an e-mail address, and a combination thereof.

3. The method of claim 1, wherein replacing the at least one piece of personal information created by the document-generating application with the generic information visible at each comment block of the first document comprising replacing the at least one piece of personal information with the generic information comprising at least one of the following: a string of letters, numbers, symbols, and spaces.

4. The method of claim 1, wherein saving the first document further comprising removing the at least one piece of personal information from display in the comment block appearing within the first document when the first document is saved.

5. The method of claim 1, further comprising generating, by the document-generating program, the comment block containing a comment added to the first document by a user of the program and also containing personal information about the user adding the comment.

6. The method of claim 5, wherein activating the privacy option removes the at least one piece of personal information from the document and from the comment block of the document without removing the comment block and the comment added to the document and displayed within the document.

7. The method of claim 1, wherein replacing the at least one piece of removed personal information with the generic information in both the memory representation of the first document and the file representation of the first document comprises maintaining content corresponding to the at least one piece of personal information in a text portion in both the memory representation of the first document and the file representation of the first document.

8. A computing system containing at least one application module usable on the computing system, wherein the at least one application module comprises application code for performing the method of claim 1.

9. A method for removing personal information from a document created by a document-generating program that makes the personal information visible at a comment block of the document, the method comprising:

receiving input of at least one piece of personal information into at least one data storage field of the document-generating program in response to a request for personal information from the document-generating program during installation of the document-generating program;

receiving input to activate a computer-implemented privacy option provided by the document-generating program for the document;

removing, in response to receiving input to activate the computer-implemented privation option, the at least one piece of personal information from all portions of the document except for a body of the document, and from the comment block within the document, without deleting the document;

replacing, by the document generating program, the at least one piece of removed personal information with generic information visible in the comment block within the document, wherein the generic information was not previously visible at each comment block of the document;

receiving at least one additional piece of personal information into the document after activation of the privacy option of the document, wherein the at least one additional piece of personal information entered into first document is removed from the document as soon as the at least one additional piece of personal information is added to the document is when a save option is not available for the document;

receiving input, by the document-generating program, to save the document when the save option is available for the document; and in response to receiving input, by the document-generating program, to save the document:

removing the at least one piece of personal information and the at least one additional piece of personal information from the document and the comment visible within block of the document, and replacing the at least one piece of personal information and the at least one additional piece of personal information with generic information in the document and the comment box visible within block of the document in both a memory representation of the document and a file representation of the document.

10. The method of claim 9, wherein removing from all portions of the first document except for the body of the first document the at least one piece of the personal information without deleting the first document comprises removing the at least one piece of personal information comprising at least one of the following an author's name, a user's name, a company name, a manager's name, a last saved by name, an e-mail address, and a combination thereof.

11. The method of claim 9, wherein replacing, by the document generating program the at least one piece of removed personal information with the generic information visible in the comment block within the document comprises replacing the at least one piece of removed personal information with at least one of the following: a string of letters, numbers, symbols, and spaces.

12. The method of claim 9, further comprising removing the at least one additional piece of personal information entered into the document, wherein removing the at least one additional piece of personal information comprises:

removing the at least one additional piece of personal information as soon as an "OK" prompt provided by the document-generating program is replied to by a user, removing the at least one additional piece of personal information as soon as the document is closed, replacing the at least one additional piece of personal information with the generic information as soon as the at least one additional piece of personal information are added to the document, replacing the at least one additional piece of personal information as soon as the "OK" prompt provided by the document-generating program is replied to by the user, and replacing the at least one additional piece of personal information as soon as the document is closed.

13. A computing system containing at least one application module usable on the computing system, wherein the at least one application module comprises application code for performing the method of claim 9.

14. A computer readable medium having stored thereon computer-executable instructions for performing the method of claim 9.

15. A computer readable medium having a set of instructions which when executed performs a method for removing personal information from a comment block within a document, the method executed by the set of instructions comprising:

activating a computer-implemented privacy option provided by the instructions;

removing, in response to activating the computer-implemented privacy option, at least one piece of personal information from all portions of the document except for a body of the document without deleting the document, the at least one piece of the personal information being requested by a document-generating application during installation of the document-generating application;

replacing the at least one piece of personal information with generic information visible in the comment block of the document, wherein the generic information was not previously visible at each comment block of the first document;

receiving at least one additional piece of personal information into the document after activation of the privacy option of the document, wherein the at least one additional piece of personal information entered into the document is one of the following:

when a save option is not available for the document, removed from the document as soon as the at least one additional piece of personal information is added to the document, and when the save option is available for the document, removed from the document as soon as the document is saved; and saving the document, when the save option is available for the document, with the generic information replacing the at least one piece of removed personal information, wherein saving the document comprises, in response to activating the privacy option, replacing the at least one piece of removed personal information and the at least one additional piece of personal information with the generic information in both a memory representation of the document and a file representation of the document.

16. The computer readable medium of claim 15, wherein replacing the at least one piece of removed personal information with the generic information in both the memory representation of the document and the file representation of the document comprises maintaining content corresponding to the at least one piece of personal information in a text portion in both the memory representation of the document and the file representation of the document.

17. A method for removing personal information from a document created by a document-generating application that stores the personal information and makes the personal information visible at a comment block of the document, the method comprising:

activating a privacy option comprising computer-implemented instructions provided by the document-generating application;

receiving at least one piece of personal information into the document after activation of the privacy option of the document, wherein the at least one piece of personal information entered into first document is removed from the document as soon as the at least one piece of personal information is added to the document is when a save option is not available for the document;

upon subsequent addition of the at least one piece of personal information, automatically removing, when the save option is not available for the document, from all portions of the document except for a body of the document the at least one piece of the personal information without deleting the document, the at least one piece of the personal information being requested by the document-generating application during installation of the document-generating application, the at least one piece of personal information comprising at least one of the following: an author's name, a user's name, a company name, a manager's name, a last saved by name, and an e-mail address, wherein automatically removing the at least one piece of personal information from the document comprises replacing the at least one piece of personal information created by the document-generating application with generic information visible at each comment block of the document, wherein the generic information comprises at least one of the following: a string of letters, numbers, symbols, and spaces, and wherein the generic information was not previously visible at each comment block of the document; and saving the document, when the save option is available for the document, with the generic information replacing the at least one piece of personal information, wherein saving the document comprises:

in response to activating the privacy option and saving the document, replacing the at least one piece of removed personal information with the generic information in both a memory representation of the document and a file representation of the document, wherein replacing the removed personal information with the generic information in both the memory representation of the document and the file representation of the document comprises maintaining content corresponding to the at least one piece of personal information in a text portion in both the memory representation of the document and the file representation of the document, and removing the at least one piece of personal information from display in the comment block appearing within the first document when the document is saved.

* * * * *